US010436040B2

(12) United States Patent
Rhodes et al.

(10) Patent No.: US 10,436,040 B2
(45) Date of Patent: Oct. 8, 2019

(54) AIRFOIL WITH DUAL-WALL COOLING FOR A GAS TURBINE ENGINE

(71) Applicant: Rolls-Royce Corporation, Indianapolis, IN (US)

(72) Inventors: Jeffery F. Rhodes, Zionsville, IN (US); Tyler C. Gillen, Indianapolis, IN (US); Christopher Nash, Indianapolis, IN (US); Brian Shoemaker, Indianapolis, IN (US); Brett J. Barker, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 108 days.

(21) Appl. No.: 15/729,861

(22) Filed: Oct. 11, 2017

(65) Prior Publication Data
US 2018/0202295 A1    Jul. 19, 2018

Related U.S. Application Data
(60) Provisional application No. 62/445,966, filed on Jan. 13, 2017.

(51) Int. Cl.
| | |
|---|---|
| *F01D 5/18* | (2006.01) |
| *F01D 5/14* | (2006.01) |
| *F01D 5/20* | (2006.01) |

(52) U.S. Cl.
CPC ............ *F01D 5/187* (2013.01); *F01D 5/14* (2013.01); *F01D 5/18* (2013.01); *F01D 5/20* (2013.01);
(Continued)

(58) Field of Classification Search
CPC ... F01D 5/187; F01D 5/14; F01D 5/18; F01D 5/20; F05D 2220/32; F05D 2240/301;
(Continued)

(56) References Cited

U.S. PATENT DOCUMENTS
| | | | |
|---|---|---|---|
| 5,640,767 A | 6/1997 | Jackson et al. | |
| 6,554,575 B2 * | 4/2003 | Leeke | F01D 5/186 416/224 |

(Continued)

FOREIGN PATENT DOCUMENTS
| | | |
|---|---|---|
| EP | 1 764 477 B1 | 7/2008 |
| EP | 2 469 030 A2 | 6/2012 |

(Continued)

OTHER PUBLICATIONS
European Search Report and Written Opinion for European Patent No. 18150395.4-1006, dated Apr. 23, 2018, 5 pages.
(Continued)

*Primary Examiner* — Lindsay M Low
*Assistant Examiner* — Yi-Kai Wang
(74) *Attorney, Agent, or Firm* — Brinks Gilson & Lione

(57) ABSTRACT

An airfoil with dual wall cooling for a gas turbine engine comprises a spar having pressure and suction side walls that meet at leading and trailing edges of the airfoil, with a tip extending therebetween. An interior of the spar includes a coolant cavity, and each of the pressure and suction side walls includes an arrangement of pedestals on an outer surface thereof and a plurality of cooling holes in fluid communication with the coolant cavity. A pressure side coversheet overlies the pressure side wall and terminates in a radial direction short of the tip of the spar to form a shelf extending along a chordal direction. Flow channels between the pressure side wall and coversheet are configured to direct coolant from the cooling holes to radial flow outlets adjacent to the shelf. A suction side coversheet overlies the suction side wall, and a coolant circuit between the suction side wall and coversheet does not include radial coolant outlets.

23 Claims, 10 Drawing Sheets

(52) U.S. Cl.
CPC .... *F05D 2220/32* (2013.01); *F05D 2240/301* (2013.01); *F05D 2240/305* (2013.01); *F05D 2240/306* (2013.01); *F05D 2240/307* (2013.01); *F05D 2260/20* (2013.01)

(58) Field of Classification Search
CPC ......... F05D 2240/305; F05D 2240/306; F05D 2240/307; F05D 2260/20
USPC ........................................................ 416/96 A
See application file for complete search history.

(56) References Cited

U.S. PATENT DOCUMENTS

| | | | |
|---|---|---|---|
| 6,991,430 | B2 | 1/2006 | Stec et al. |
| 7,740,445 | B1 | 6/2010 | Liang |
| 8,011,889 | B1 | 9/2011 | Liang |
| 9,085,988 | B2 | 7/2015 | Kwon et al. |
| 9,103,217 | B2 | 8/2015 | Giglio et al. |
| 9,284,845 | B2 | 3/2016 | Lewis et al. |
| 2011/0236221 | A1 | 9/2011 | Campbell |
| 2012/0189427 | A1* | 7/2012 | Kwon ........................ F01D 5/20 415/1 |
| 2014/0234088 | A1* | 8/2014 | Brandl ...................... F01D 5/081 415/177 |
| 2017/0002663 | A1* | 1/2017 | Quach ........................ F01D 5/20 |
| 2017/0211395 | A1 | 7/2017 | Heffernan et al. |
| 2018/0135423 | A1* | 5/2018 | Dyson ........................ F01D 5/18 |

FOREIGN PATENT DOCUMENTS

| | | |
|---|---|---|
| JP | 2011 111947 A2 | 6/2011 |
| WO | WO 2015/042009 A1 | 3/2015 |

OTHER PUBLICATIONS

Xu, Li et al., "Evolution of Rolls-Royce Air-cooled Turbine Blades and Feature Analysis," *Procedia Engineering*, 99 (2015) pp. 1482-1491.

\* cited by examiner

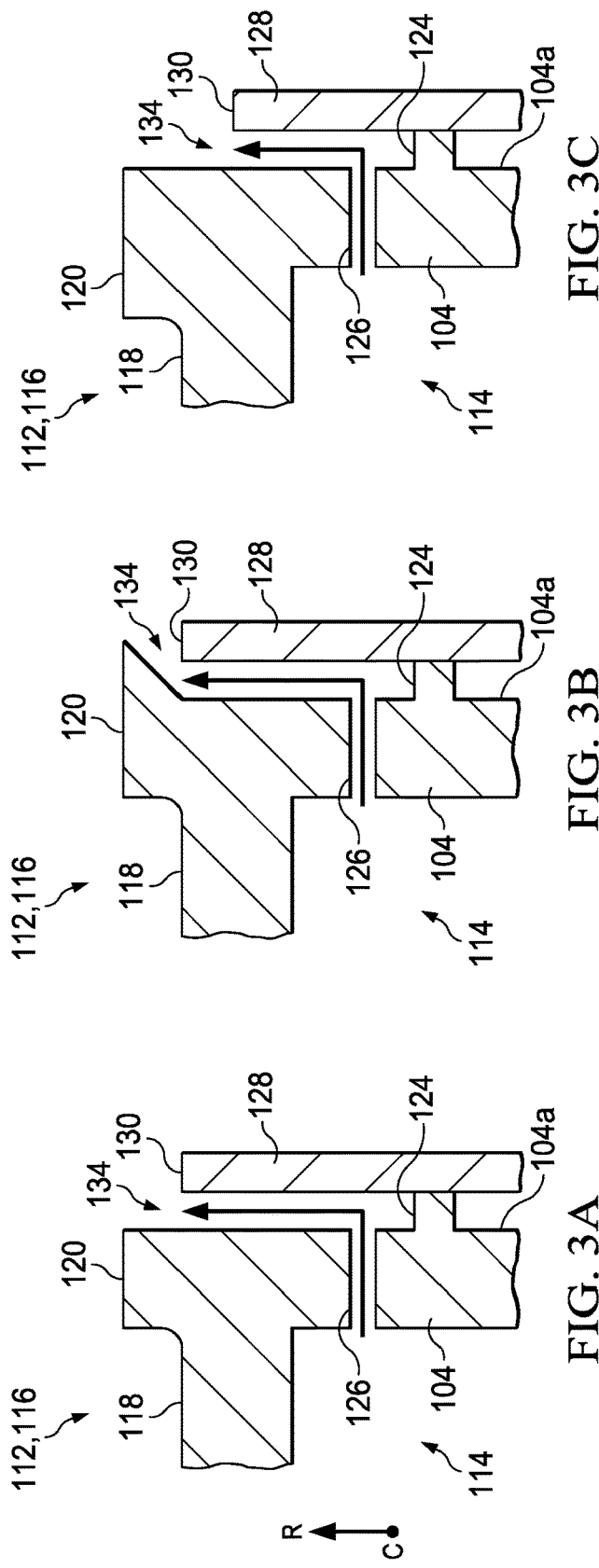

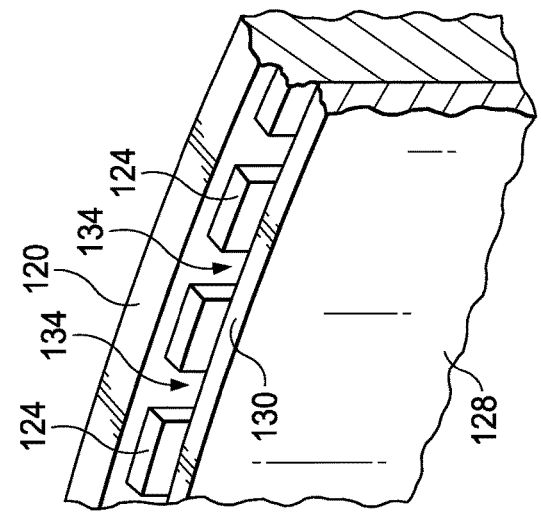
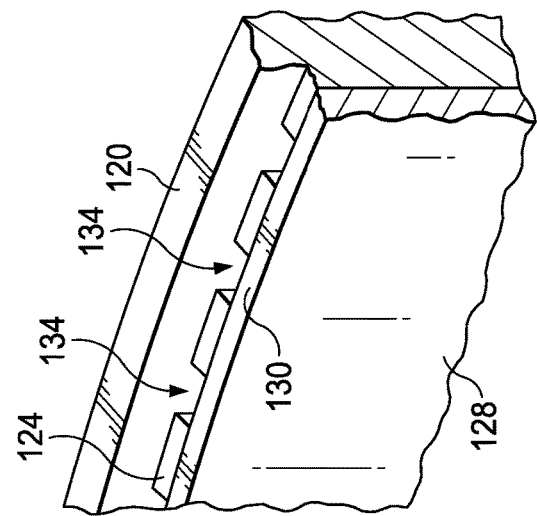
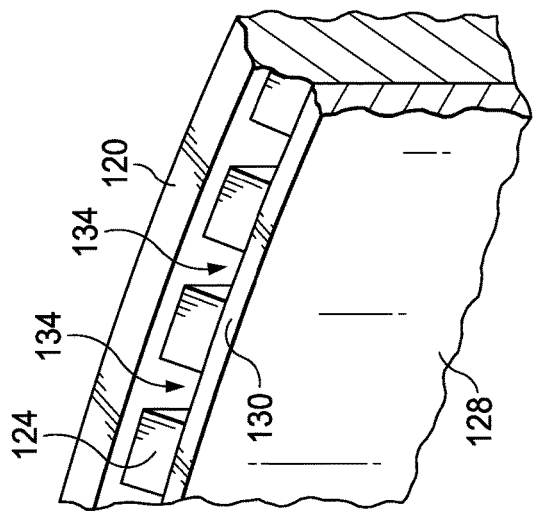

AIRFOIL WITH DUAL-WALL COOLING FOR A GAS TURBINE ENGINE

RELATED APPLICATIONS

The present patent document claims the benefit of priority under 35 U.S.C. § 119(e) to U.S. Provisional Patent Application Ser. No. 62/445,966, filed on Jan. 13, 2017, and hereby incorporated by reference in its entirety.

TECHNICAL FIELD

The present disclosure is directed to an airfoil for a gas turbine engine and more particularly to dual-wall cooling of a tip portion of an airfoil.

BACKGROUND

Gas turbine engines include a compressor, combustor and turbine in flow series along a common shaft. Compressed air from the compressor is mixed with fuel in the combustor to generate hot combustion gases that rotate the turbine blades and drive the compressor. Improvements in the thrust and efficiency of gas turbine engines are linked to increasing turbine entry temperatures, which places a heavy burden on turbine blades. Consequently, there is significant interest in developing improved cooling techniques for airfoils in gas turbine engines.

BRIEF SUMMARY

An airfoil with dual wall cooling for a gas turbine engine comprises a spar having a pressure side wall and a suction side wall that meet at a leading edge and at a trailing edge of the airfoil, with a tip extending therebetween. An interior of the spar includes a coolant cavity, and each of the pressure side wall and the suction side wall includes an arrangement of pedestals on an outer surface thereof and a plurality of cooling holes in fluid communication with the coolant cavity. A pressure side coversheet overlies the pressure side wall and terminates in a radial direction short of the tip of the spar to form a shelf extending along a chordal direction. An inner surface of the pressure side coversheet is in contact with the arrangement of pedestals so as to define flow channels between the pressure side wall and the pressure side coversheet. The flow channels are configured to direct coolant from the cooling holes to radial flow outlets adjacent to the shelf. A suction side coversheet overlies the suction side wall, and an inner surface of the suction side coversheet is in contact with the arrangement of pedestals so as to define a suction side coolant circuit between the suction side wall and the suction side coversheet. The suction side coolant circuit does not include radial coolant outlets.

BRIEF DESCRIPTION OF THE DRAWINGS

FIGS. 3A-3C show constant chord-wise cross-sectional views of tip portions having different pressure side rail geometries.

FIGS. 8A-8C show perspective views of exemplary tip portions having different pedestal configurations adjacent to the pressure side shelf.

DETAILED DESCRIPTION

Figure 1:
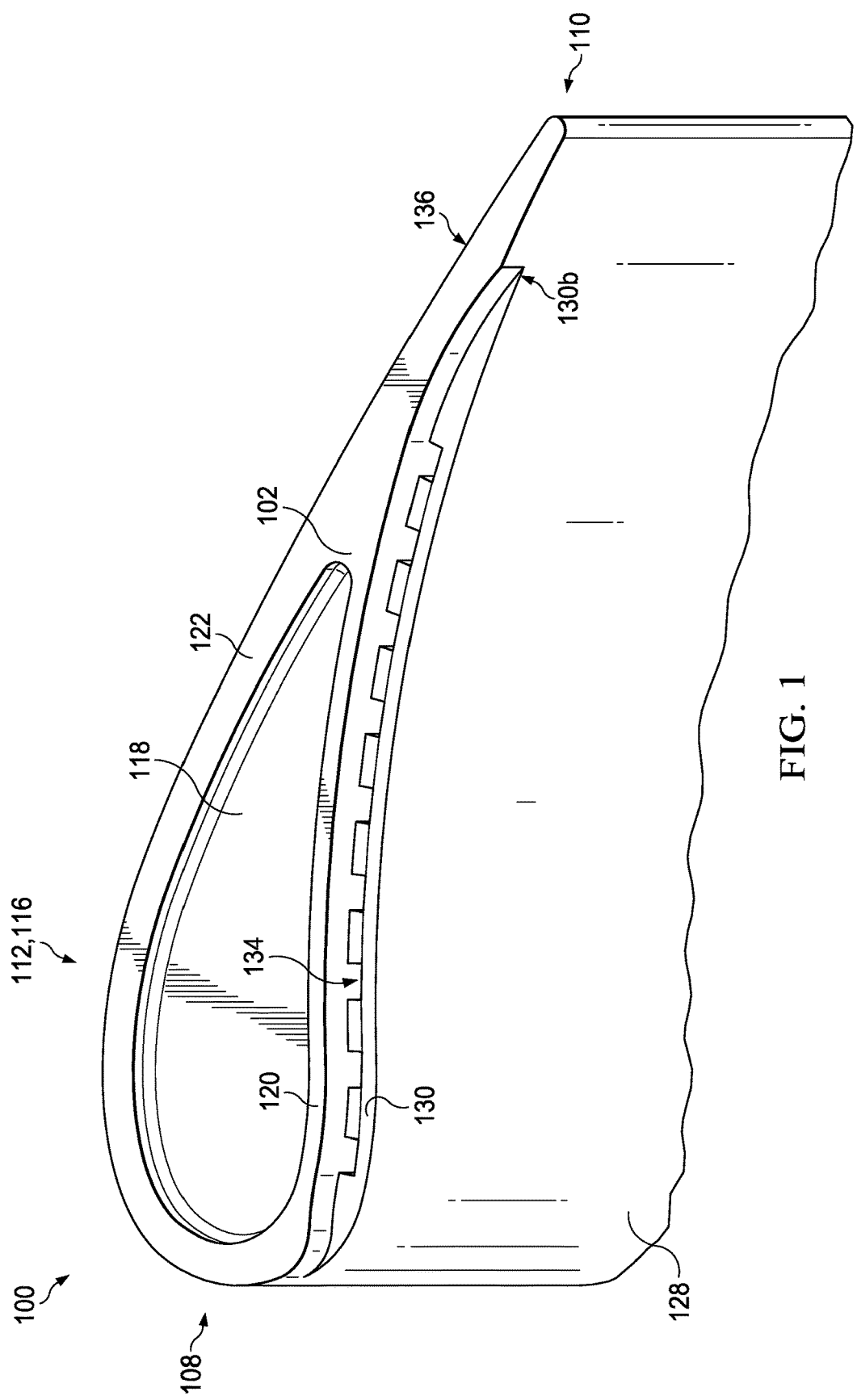
FIG. 1 shows a perspective view of an exemplary tip portion of an airfoil with dual wall cooling for a gas turbine engine.
Figure 2:
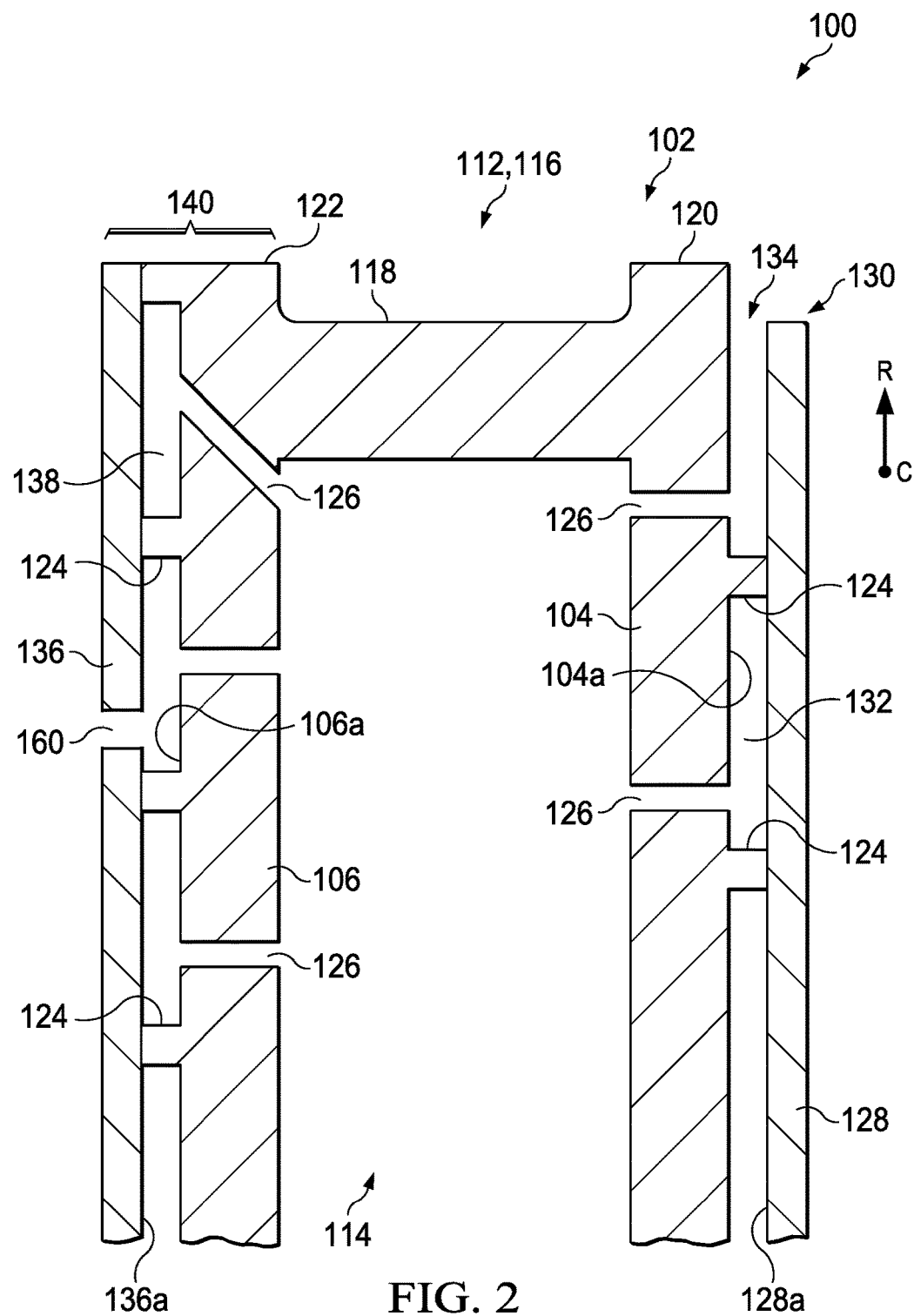
FIG. 2 shows a constant chord-wise cross-sectional view of the exemplary tip portion of FIG. 1.

FIG. 1 shows an exemplary tip portion of an airfoil with dual wall cooling for a gas turbine engine, and FIG. 2 shows a cross-sectional view of the tip portion. The airfoil 100 includes a spar 102 having a pressure side wall 104 and a suction side wall 106 meeting at a leading edge 108 and at a trailing edge 110 of the airfoil. A tip 112 extends between the pressure and suction side walls 104, 106, and an interior of the spar 102 includes a coolant cavity 114. In this example, the tip 112 is a squealer tip 116 including a radially-recessed surface cavity 118 bounded by the pressure side wall 104 and the suction side wall 106. The portion of the pressure side wall 104 extending radially beyond the surface cavity 118 may be referred to as a pressure side rail 120, and the portion of the suction side wall 106 extending radially beyond the surface cavity 118 may be referred to as a suction side rail 122. Each of the pressure side wall 104 and the suction side wall 106 includes an arrangement of pedestals 124 on an outer surface 104a,106a thereof and a plurality of cooling holes 126 in fluid communication with the coolant cavity 114.

A pressure side coversheet 128 overlies the pressure side wall 104 and terminates in a radial direction short of the tip 112,116 of the spar 102 to form a shelf 130 extending along a chordal direction. An inner surface 128a of the pressure side coversheet 128 is in contact with the arrangement of pedestals 124 so as to define a flow pathway (or flow channels) 132 between the pressure side wall 104 and the pressure side coversheet 128. Consequently, coolant emerging from the cooling holes 126 impinges on the inner surface 128a of the coversheet 128 and follows the flow pathway 132 determined by the arrangement of pedestals 124 on the spar 102. The flow channels 132 are configured to direct coolant from the cooling holes 126 to radial flow outlets 134 adjacent to the shelf 130. When the term "radial" is used as a modifier for "flow outlets" or "coolant outlets," the outlets may be understood to be radially directed or radially aligned in the direction of the tip, where the radial direction R is shown in FIG. 2. The shelf 130 may extend in the chordal (or chord-wise) direction C, also shown in FIG. 2, from at or near the leading edge 108 to a pressure-side location 130b short of the trailing edge 110. In other words, the shelf 130 may extend from at or near the stagnation point 108, where the mainstream flow velocity is zero, to the pressure-side location 130b.

As can be seen from the constant chord-wise cross-sectional views of FIGS. 3A-3C, coolant may be ejected from the radial flow outlets 134 in a radial direction toward the tip 112,116, thereby effectively cooling the tip. The radial direction may be understood to be substantially parallel to the outer surface 104a of the pressure side wall 104. In addition to the radial flow outlets 134, coolant may be ejected from the flow channels 132 through additional holes in the pressure side coversheet 128.

It should be noted that when a structure (e.g., shelf 130, pressure side rail 120, suction side rail 122, etc.) is described as being disposed "near the [position]" or "short of the [position]," where [position] may be substituted with leading edge, trailing edge, or another location, it may be understood that the structure is disposed a distance d or less from the [position], where the distance d is equal to 20% of the total length from the leading edge 108 to the trailing edge 110, as measured along a centerline of the tip 112.

As shown in FIGS. 3B and 3C, the pressure side rail 120, which is adjacent to the radially-recessed surface cavity 118, may have an increased thickness compared to the portion of the pressure side wall 104 that lies adjacent to the coolant cavity 114. In one example, the pressure side rail 120 may flare outward, as shown in FIG. 3B, thereby increasing in thickness along the radial direction. In another example shown in FIG. 3C, the increased thickness may be due to the incorporation of additional material on an inner surface (i.e., the surface facing the surface cavity 118) of the pressure side rail 120. Such configurations may be beneficial to provide additional surface area on the rail 120 for abrasive coating applications.

Figure 4A:
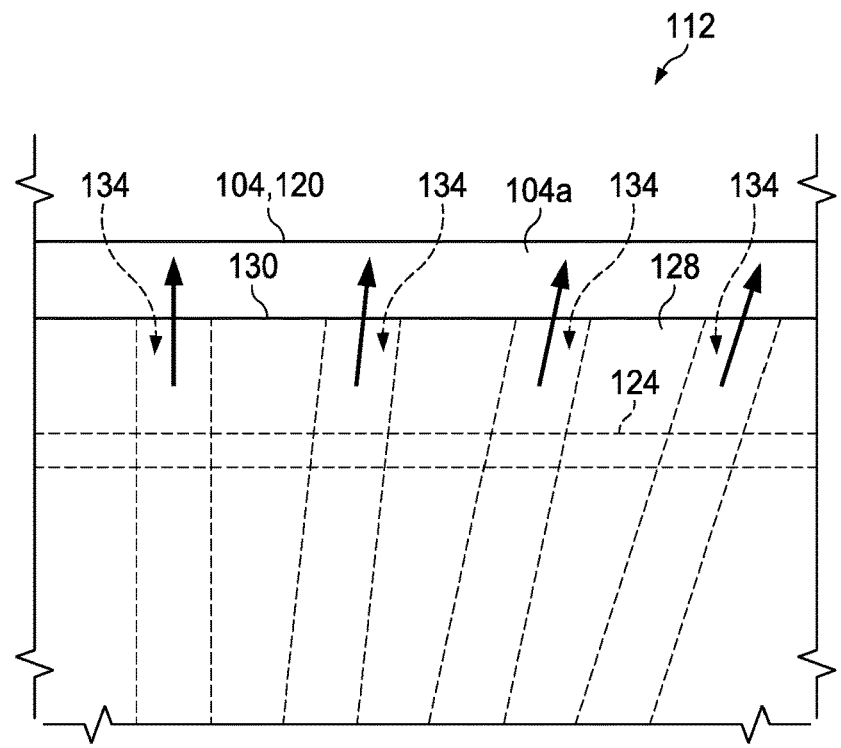
FIG. 4A shows a view of an exemplary tip portion normal to the pressure side wall according to one embodiment, where coolant exits pressure side flow channels through one or more slanted radial flow outlets.

Referring now to FIG. 4A, which shows a view of part of the tip portion of the airfoil 100 normal to the pressure side wall 104, including the pressure side rail 120, the pressure side coversheet 128, and the shelf 130, it can be seen that the radial flow outlets 134 may eject coolant toward the tip 112 in a direction that has both a radial component and an angled or chordal component. The direction may still be described as a radial direction as the radial flow outlets 134 are substantially parallel to the outer surface 104a of the pressure side wall 104 adjacent to the shelf 130. However, they may be angled in a plane of the surface 104a toward the trailing edge 110 and/or toward the leading edge 108 so as to direct the coolant both over the tip 112 and toward either edge 108,110 of the airfoil 100. Such radial flow outlets 134 may be referred to as "slanted" radial flow outlets 134. Due to the angling or slanting toward the leading edge 108, the slanted radial flow outlets 134 may have a larger opening at the shelf 130 for the same flow channel diameter, which may help to promote cooling of the pressure side wall 104.

Figure 4B:
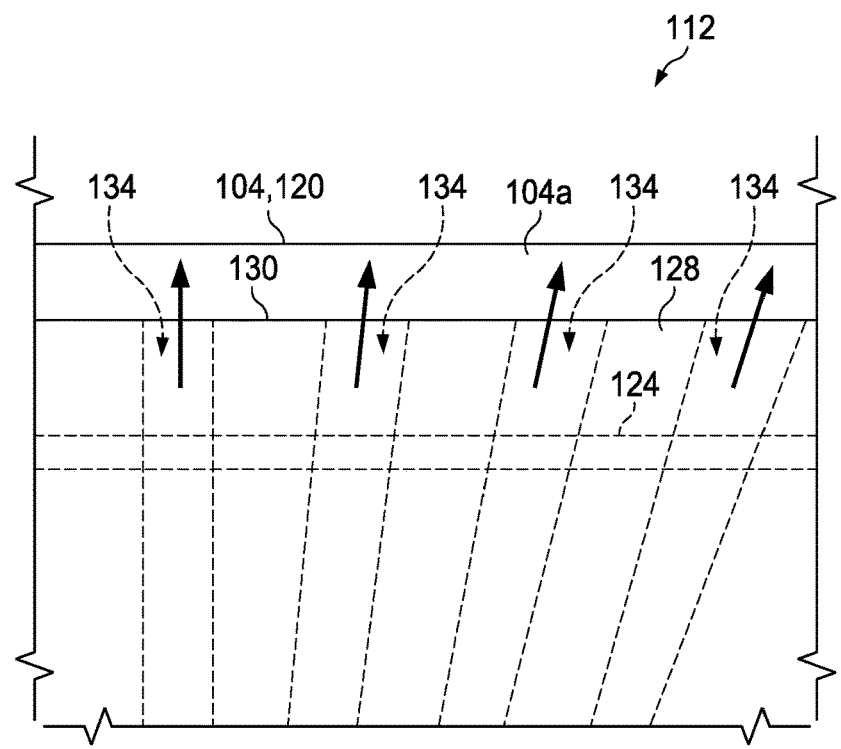
FIG. 4B shows a view of an exemplary tip portion normal to the pressure side wall according to another embodiment, where coolant exits pressure side flow channels through one or more slanted and/or diffusing radial flow outlets.
Figure 4C:
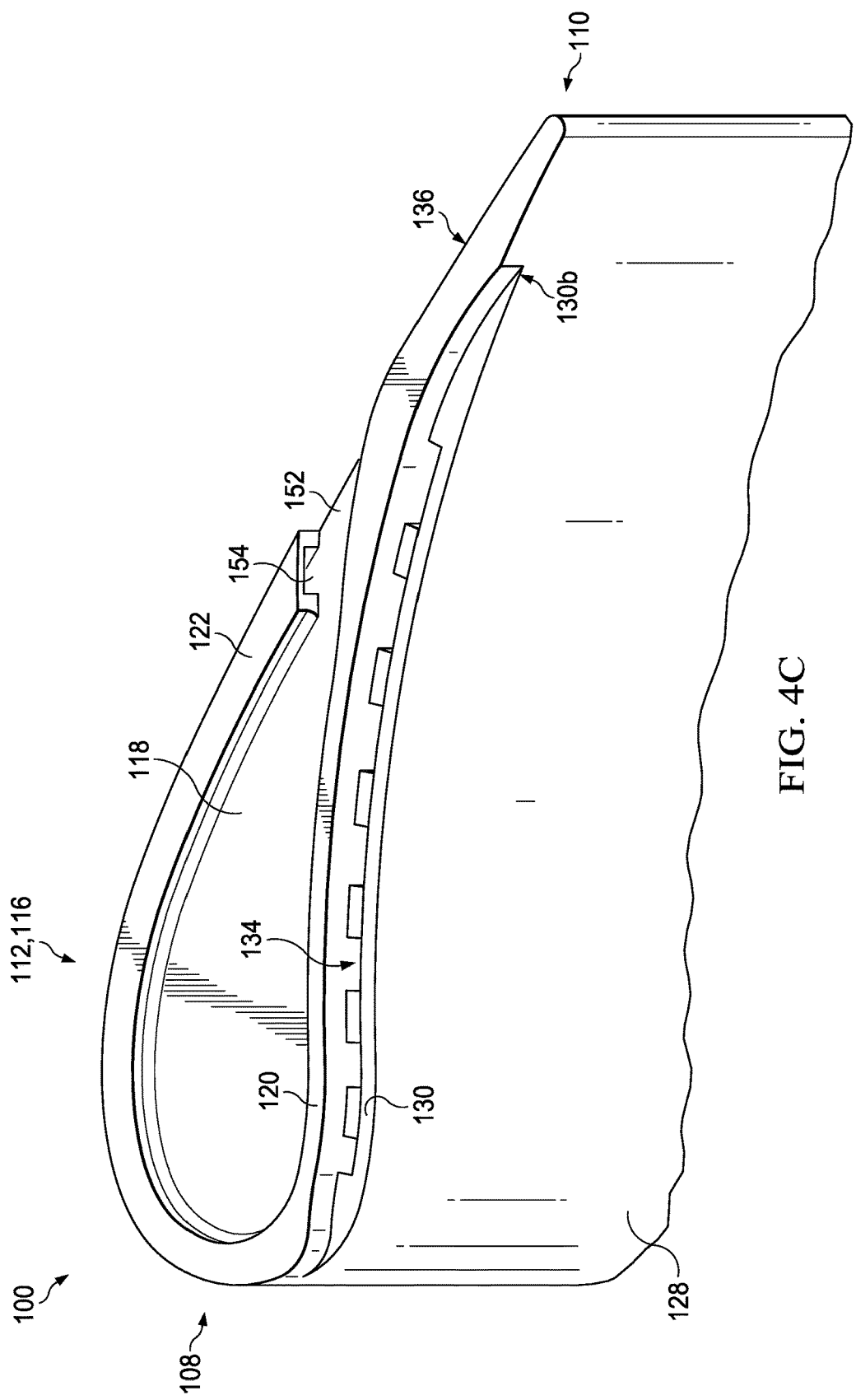
FIG. 4C shows a perspective view of an exemplary tip portion that includes slanted and/or diffusing radial flow outlets as well as a suction side exit slot that directs coolant in a non-radial direction.

Referring now to FIG. 4B, the radial flow outlets 134 may also or alternatively exhibit an increasing cross-sectional area ("diffusion") along the radial direction. Such radial flow outlets may be referred to as "diffusing" radial flow outlets 134. The cross-sectional area increase of the diffusing radial flow outlets 134 leads to an expanded size of the openings at the shelf 130, similar to the effect observed with the slanted radial flow outlets 134 described above. As would be apparent to one of ordinary skill in the art, a given radial flow outlet may be both slanted and diffusing, or just slanted, or just diffusing. FIG. 4C shows a perspective view of an exemplary tip portion where the radial flow outlets 134 include slanted and/or diffusing radial flow outlets 134 that exhibit larger openings at the pressure side shelf 130.

One advantage of having slanted and/or diffusing radial flow outlets is that coverage of the coolant along the pressure side wall 104 may be increased. Diffusing radial flow outlets 134 may also limit the radial momentum of the flowing coolant, which reduces the likelihood that the coolant may be instantly swept over the pressure side wall 104 due to a favorable pressure gradient. Thus, the coolant may travel along the pressure side wall 104 to a further aft position, thereby better cooling the trailing edge 110.

Referring again to FIGS. 1 and 2, a suction side coversheet 136 overlies the suction side wall 106 and has an inner surface 136a in contact with the arrangement of pedestals 124 so as to define a coolant circuit 138 between the suction side wall 106 and the suction side coversheet 136. Coolant emerging from the cooling holes 126 impinges on the inner surface 136a of the suction side coversheet 136 and follows the coolant circuit 138 determined by the arrangement of pedestals 124 on the spar 102. In contrast to the pressure side of the airfoil 100, the coolant circuit 138 on the suction side of the airfoil 100 does not include radial coolant outlets. The suction side coversheet 136 may extend in a chordal direction from a location short of the leading edge 108, as discussed further below, to the trailing edge 110 of the airfoil 100.

Figure 5:
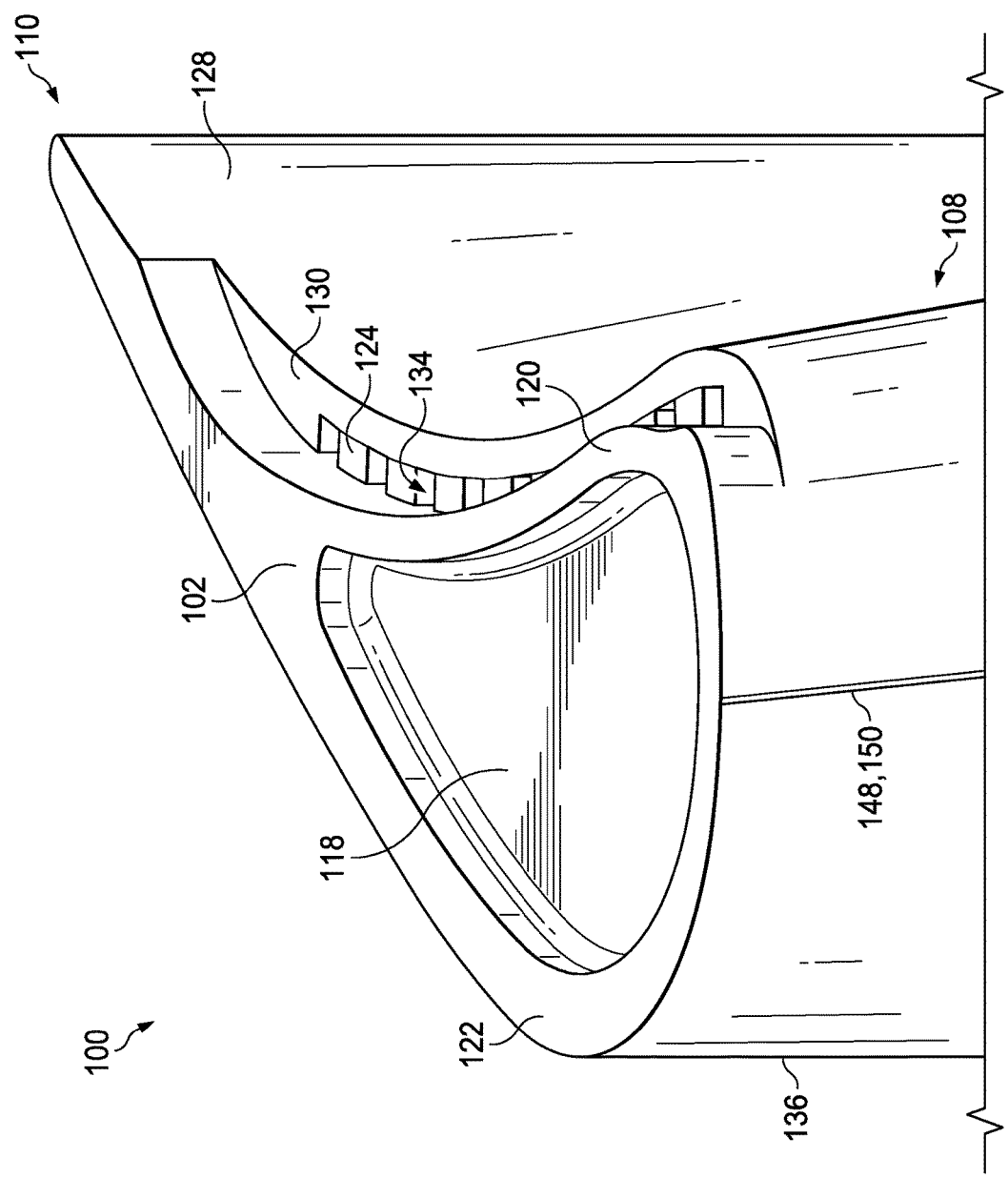
FIG. 5 shows another perspective view of the tip portion of FIG. 1.

As can be seen in FIGS. 2 and 5, the suction side coversheet 136 may extend full-span in the radial direction and terminate at the tip 112 of the spar, thereby forming a dual-wall structure 140 with the suction side rail 122. In such an embodiment, the coolant circuit 138 may be designed to direct the coolant from cooling holes 126 in the suction side wall 106 through one or more exit holes 160 in the suction side coversheet 136 and/or through one or more exit slots at or near the trailing edge 110. The cooling holes 126 in the suction side wall 106 in fluid communication with the coolant cavity 114 may be directed normal to the wall 106 or in an off-normal direction. For example, depending on the depth of the surface cavity 118, one or more of the cooling holes 126 may be slanted within the suction side wall 106 in order to access the portion of the coolant circuit 138 adjacent to the suction side rail 122, as shown in FIG. 2. The flow passing through this portion of the coolant circuit 138 may exit through exit holes 160 in the suction side coversheet 136 and enter the mainstream flow upstream of where it enters the coolant circuit 138 (counter-flow), downstream of where it enters the coolant circuit 138 (co-flow) or radially inward from where it enters the coolant circuit 138. In the co-flow configuration, the coolant may also or alternatively travel to the exit slot(s) at or near the trailing edge 110 to provide cooling. For example, referring again to FIG. 4C, an exemplary exit slot 154 in the suction side rail 122 is shown for a configuration in which there is a break in—or termination point of—the suction side rail 122. The break or termination point in the suction side rail 122 creates a suction side exit 152 from the surface cavity 118 and also provides a location for the exit slot 154. The exit slot 154 directs flow in a chordal direction from the coolant circuit 138 onto the surface cavity 118, promoting cooling of the tip 112,116 and the trailing edge 110. The break or termination point in the suction side rail 122 may be located near the trailing edge 110. Generally speaking, in contrast to the radial flow outlets 134 on the pressure side of the airfoil 100, exit holes or slots on the suction side or at the trailing edge 110 of the airfoil 100 may direct the coolant in a non-radial direction, e.g., in a direction transverse to the radial direction, such as in a chordal direction, and/or in an outward or normal direction (e.g., with respect to the suction side wall 106 of the airfoil 100). Thus, the exit holes or slots on the suction side (e.g., in the suction side rail 122 or suction side coversheet 136) or at the trailing edge 110 of the airfoil 100 may be described as non-radial coolant outlets.

Figure 6:
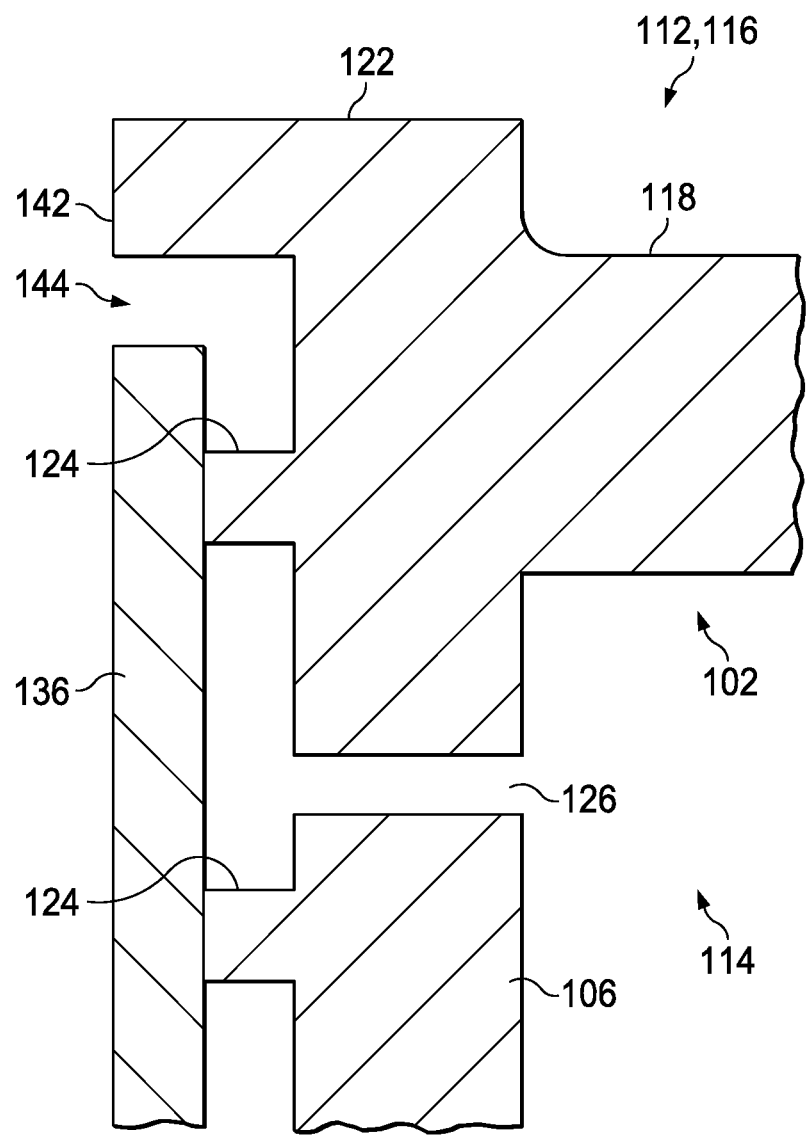
FIG. 6 shows a constant chord-wise cross-sectional view of an exemplary tip portion.
Figure 7:
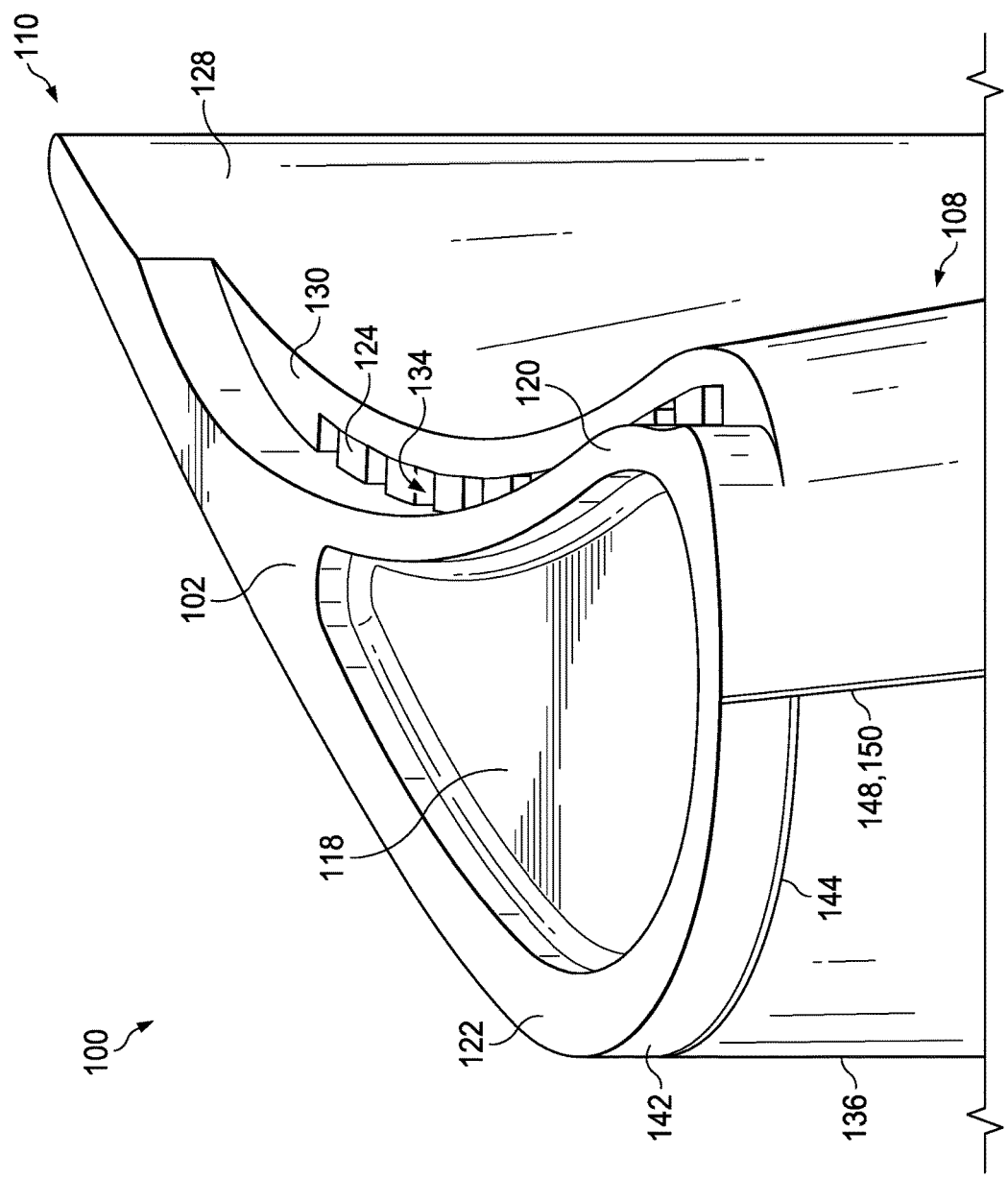
FIG. 7 shows a perspective view of the exemplary tip portion shown in cross-section in FIG. 6.

As an alternative to the dual-wall structure 140, the suction side coversheet 136 may terminate short of full-span but remain radially flush with the suction side wall 106 due to an overhanging portion 142 from the spar 102, as shown in FIGS. 6 and 7. In this embodiment, coolant may be ejected normal to the mainstream air flow from a coolant outlet or slot 144 that lies between the overhanging portion 142 and a termination end of the coversheet 136. The coolant outlet is in fluid communication with the coolant circuit 138.

The pressure side coversheet 128 may extend in a chordal direction from the leading edge 108 to a location short of the trailing edge 110 of the airfoil 100 on the pressure side of the airfoil 100 (e.g., the pressure-side location 130b where the shelf 130 terminates). In one example, the pressure side coversheet 128 may wrap around the leading edge 108 so as to extend from a suction-side location 148 of the airfoil 100 to the trailing edge 110. A portion of the pressure side coversheet 128 that wraps around the leading edge 108 (or beyond the chordal position of the shelf 130) may extend full-span in a radial direction. The suction side coversheet 136 may extend in a chordal direction from roughly the suction-side location 148 of the pressure side coversheet 128 to the trailing edge 110. The suction side coversheet 136 and pressure side coversheet 128 may not meet at the suction-side location 148 but rather may be spaced apart by a distance sufficient to form a radial gill slot 150 for coolant ejection, as shown for example in FIGS. 5 and 7. Near to the leading edge (or stagnation point) 108, the pressure side coversheet 128 may include additional holes for ejection of coolant.

The pedestals 124 are understood to be raised portions of the outer surface 104a,106a of the pressure side wall 104 or the suction side wall 106 that may contact and be bonded to the inner surface 128a,136a of the pressure side or suction side coversheet 128,136. The pedestals 124 or dams may have a height or thickness that determines the spacing between the overlying coversheet 128,136 and non-raised portions of the spar 102. When viewed from a direction normal to the pressure side wall 104 or the suction side wall 106, the pedestals 124 may have a two-dimensional geometry selected from among discrete shapes such as a circle, square, pentagon or other polygon. Alternatively, one or more of the pedestals 124 may have an elongated shape, taking the form of a curved, straight or angled (e.g., zigzag) rail. The size, shape and arrangement of the pedestals 124 may be selected to determine the flow pathway 132 along the outer surface 104a of the pressure side wall 104 and also the coolant circuit 138 over the outer surface 106a of the suction side wall 106. In addition to directing the flow of coolant, the pedestals 124 may facilitate heat transfer between the walls 104,106 and the coolant.

When viewed from along the chordal direction and/or along the radial direction, the pedestals 124 may comprise sides that extend substantially normal to (perpendicular to) the pressure side or suction side surface 104a,106a. Alternatively, the pedestals 124 may have one or more sides that extend in a non-normal (e.g., slanted) direction with respect to the pressure side or suction side wall 104,106, as shown in FIG. 8A on the pressure side wall 104. The pedestals 124 may be arranged on the outer surface 104a of the pressure side wall 104 so as to be completely covered by or flush with the pressure side coversheet 128, as illustrated in FIG. 8B. Alternatively, the pedestals 124 may be arranged such that one or more of the pedestals 124 are exposed above (in a radial direction) the shelf 130, as shown in FIG. 8C.

The airfoil described herein may be fabricated using investment casting and diffusion bonding methods known in the art, such as described in U.S. Pat. No. 6,003,754, entitled "Airfoil for a Gas Turbine Engine and Method of Manufacture," which is hereby incorporated by reference in its entirety. The airfoil 100, including the spar 102 and the pressure and suction side coversheets 104,106, may be formed from one or more materials that have high melting points, good oxidation/corrosion resistance and high-temperature strength. For example, nickel-base superalloys may be suitable. The superalloys may have an equiaxed, directionally solidified, or single-crystal microstructure.

Figure 9:
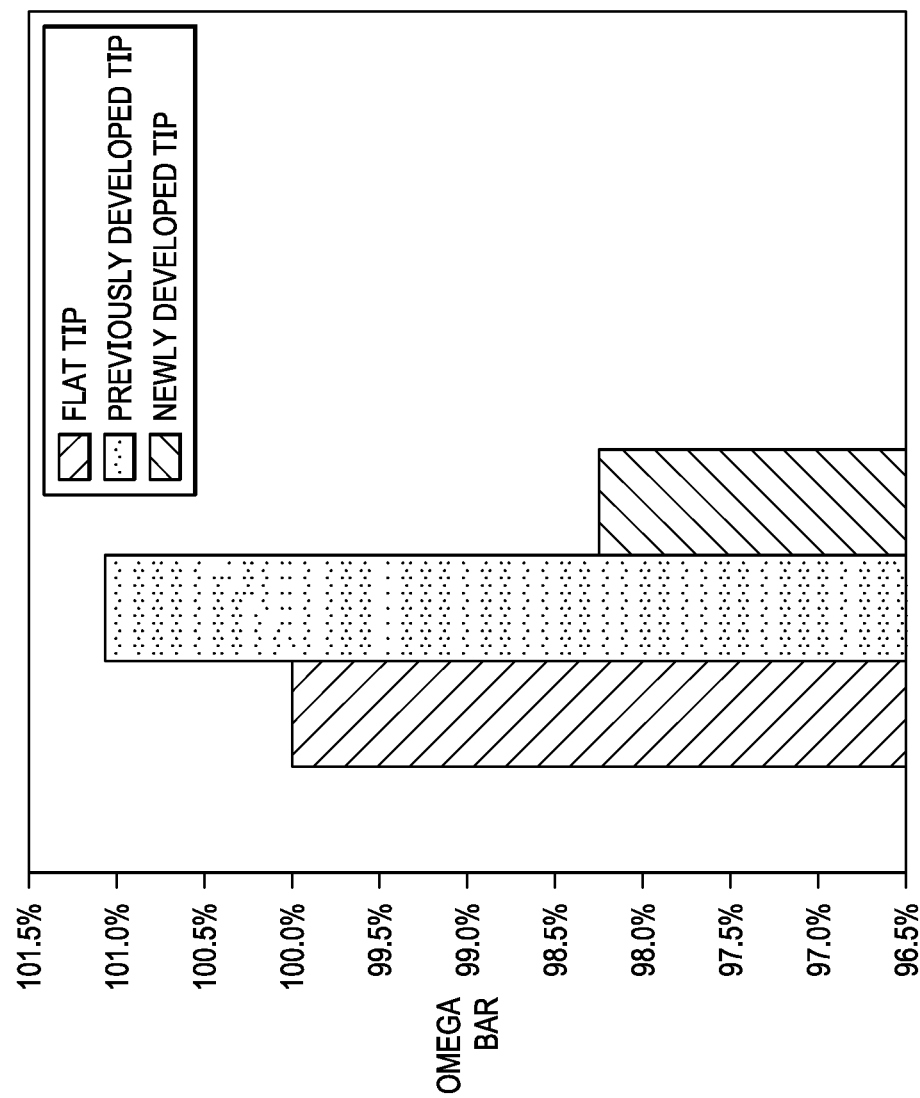
FIG. 9 shows results from computational fluid dynamics simulations.

Computational fluid dynamics (CFD) simulations are used to compare the aerodynamic loss of the inventive airfoil tip with a flat-tipped airfoil and with a previously-developed squealer tip, which is described in U.S. Pat. No. 9,085,988, entitled "Gas Turbine Engine Flow Path Member." The inventive airfoil tip described according to various embodiments in the present disclosure is referred to as the newly-developed tip in FIG. 9. The CFD simulations reveal a decrease in aerodynamic loss for the new tip construction.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

Furthermore, the advantages described above are not necessarily the only advantages, and it is not necessarily expected that all of the described advantages will be achieved with every embodiment.

What is claimed is:

1. An airfoil with dual wall cooling for a gas turbine engine, the airfoil comprising:
   a spar having a pressure side wall and a suction side wall meeting at a leading edge and a trailing edge of the airfoil with a tip extending therebetween, an interior of the spar including a coolant cavity, each of the pressure side wall and the suction side wall including an arrangement of pedestals on an outer surface thereof and a plurality of cooling holes in fluid communication with the coolant cavity;
   a pressure side coversheet overlying the pressure side wall and terminating in a radial direction short of the tip of the spar to form a shelf extending along a chordal direction, an inner surface of the pressure side coversheet being in contact with the arrangement of pedestals so as to define flow channels between the pressure side wall and the pressure side coversheet, the flow channels being configured to direct coolant from the cooling holes to radial flow outlets adjacent to the shelf; and a suction side coversheet overlying the suction side wall, an inner surface of the suction side coversheet being in contact with the arrangement of pedestals so as to define a suction side coolant circuit between the suction side wall and the suction side coversheet, wherein the suction side coolant circuit does not include radial coolant outlets.

2. The airfoil of claim 1, wherein the tip comprises a squealer tip including a radially-recessed surface cavity bounded by the suction side wall and the pressure side wall, a portion of the suction side wall extending radially beyond the surface cavity being a suction side rail, and a portion of the pressure side wall extending radially beyond the surface cavity being a pressure side rail.

3. The airfoil of claim 2, wherein the pressure side rail has a larger thickness than a portion of the pressure side wall adjacent to the coolant cavity.

4. The airfoil of claim 3, wherein an outer surface of the pressure side rail flares outward along a radial direction, or
wherein the pressure side rail includes additional material on an inner surface facing the surface cavity.

5. The airfoil of claim 1, wherein at least one of the radial flow outlets is angled toward the trailing edge or the leading edge of the airfoil in a plane of the outer surface of the pressure side wall.

6. The airfoil of claim 1, wherein at least one of the radial flow outlets has an increasing cross-sectional area along the radial direction.

7. The airfoil of claim 1, wherein the suction side coversheet extends full-span in a radial direction, the suction side coversheet terminating at the tip of the spar.

8. The airfoil of claim 1, wherein the suction side coolant circuit is configured to direct coolant from the cooling holes in the suction side wall through one or more exit slots at the trailing edge.

9. The airfoil of claim 1, wherein the suction side coolant circuit is configured to direct coolant from the cooling holes in the suction side wall through an exit slot in the suction side rail, the exit slot being positioned to direct the coolant in a chordal direction.

10. The airfoil of claim 1, wherein the suction side coolant circuit is configured to direct coolant from the cooling holes in the suction side wall through one or more exit holes in the suction side coversheet.

11. The airfoil of claim 10, wherein the cooling holes in the suction side wall and the exit holes in the suction side coversheet are configured such that coolant enters the mainstream flow upstream from where it enters the suction side coolant circuit.

12. The airfoil of claim 10, wherein the cooling holes in the suction side wall and the exit holes in the suction side coversheet are configured such that coolant enters the mainstream flow downstream from where it enters the suction side coolant circuit.

13. The airfoil of claim 10, wherein the cooling holes in the suction side wall and the exit holes in the suction side coversheet are configured such that coolant enters the mainstream flow upstream radially inward from where it enters the suction side coolant circuit.

14. The airfoil of claim 1, wherein the suction side coversheet terminates short of full-span in a radial direction and the spar comprises an overhanging portion at the tip, the suction side coversheet thereby remaining radially flush with the suction side wall.

15. The airfoil of claim 14, wherein a coolant outlet for ejecting coolant normal to the suction side wall lies between the overhanging portion and a termination end of the suction side coversheet.

16. The airfoil of claim 1, wherein the pressure side coversheet extends in a chordal direction from the leading edge to the trailing edge.

17. The airfoil of claim 16, wherein the pressure side coversheet wraps around the leading edge so as to extend from a suction-side location of the airfoil to the trailing edge.

18. The airfoil of claim 17, wherein a portion of the pressure side coversheet wrapping around the leading edge extends full-span in a radial direction.

19. The airfoil of claim 1, wherein the suction side coversheet and the pressure side coversheet are spaced apart at the suction side location by distance sufficient to form a radial gill slot for coolant ejection.

20. The airfoil of claim 1, wherein the shelf extends in a chordal direction from at or near the leading edge to a pressure-side location short of the trailing edge.

21. The airfoil of claim 1, wherein the pedestals are arranged on the outer surface of the pressure side wall so as to be completely covered by the pressure side coversheet.

22. The airfoil of claim 1, wherein the pedestals are arranged on the outer surface of the pressure side wall such that one or more of the pedestals are exposed above the shelf in a radial direction.

23. The airfoil of claim 1, wherein, when viewed from along a chordal and/or radial direction, the pedestals comprise one or more sides that extend in a non-normal direction with respect to the respective pressure or suction side wall.

* * * * *